United States Patent
Takagi

(10) Patent No.: US 9,218,555 B2
(45) Date of Patent: *Dec. 22, 2015

(54) PRINTING APPARATUS AND PRINTING CONTROL METHOD FOR DETERMINING WHETHER AND WHERE TO PRINT A WATERMARK RELATIVE TO PRINT DATA

(71) Applicant: Seiko Epson Corporation, Tokyo (JP)

(72) Inventor: Akimasa Takagi, Shiojiri (JP)

(73) Assignee: Seiko Epson Corporation, Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,032

(22) Filed: Sep. 15, 2014

(65) Prior Publication Data

US 2014/0376058 A1      Dec. 25, 2014

Related U.S. Application Data

(63) Continuation of application No. 11/158,559, filed on Jun. 22, 2005, now Pat. No. 8,867,087.

(30) Foreign Application Priority Data

Jun. 24, 2004   (JP) ................................ 2004-186363

(51) Int. Cl.
*H04N 1/40*      (2006.01)
*G06K 15/00*    (2006.01)
*B41J 11/00*     (2006.01)
*H04N 1/32*      (2006.01)
*G06K 15/02*    (2006.01)

(52) U.S. Cl.
CPC ........... *G06K 15/4095* (2013.01); *B41J 11/008* (2013.01); *G06K 15/1806* (2013.01); *H04N 1/32144* (2013.01); *H04N 1/32208* (2013.01); *H04N 1/32229* (2013.01); *H04N 1/32261* (2013.01)

(58) Field of Classification Search
CPC .............. B41J 11/008; H04N 1/32144; H04N 1/32229; H04N 1/32208
USPC ............. 358/1.9, 3.26, 3.28, 1.14, 1.15, 1.18, 358/539, 426.07, 450
See application file for complete search history.

(56) References Cited

U.S. PATENT DOCUMENTS

| | | |
|---|---|---|
| 5,850,217 A | 12/1998 | Cole |
| 6,082,619 A | 7/2000 | Ma et al. |
| 6,565,003 B1 | 5/2003 | Ma |
| 6,768,807 B1 | 7/2004 | Muratani |
| 6,789,482 B2 | 9/2004 | Yokoyama et al. |
| 6,873,426 B1 | 3/2005 | Farrell |
| 7,460,252 B2 | 12/2008 | Campbell et al. |

(Continued)

FOREIGN PATENT DOCUMENTS

| | | | | |
|---|---|---|---|---|
| EP | 1408465 A2 | * | 4/2004 | .............. G07F 17/42 |
| JP | 07-125312 | | 5/1995 | |

(Continued)

*Primary Examiner* — Gabriel Garcia

(57) ABSTRACT

A printing apparatus in which watermark data is stored and a printing control method that controls whether or not the watermark is to be printed on a receipt superimposed with specific print data received from a host apparatus. When it is determined that the watermark is not to be printed over the specific print data, a controller determines where on the receipt the specific print data is to be printed to avoid the watermark.

19 Claims, 11 Drawing Sheets

(56) References Cited

U.S. PATENT DOCUMENTS

| | | |
|---|---|---|
| 8,848,234 B2 * | 9/2014 | Tanaka ......................... 358/1.18 |
| 2002/0073214 A1 | 6/2002 | Iinuma |
| 2004/0085579 A1 | 5/2004 | Campbell et al. |
| 2004/0105126 A1 | 6/2004 | Minowa et al. |
| 2004/0112236 A1 | 6/2004 | Yokoyama et al. |
| 2004/0213432 A1 | 10/2004 | Kadota |

FOREIGN PATENT DOCUMENTS

| | | |
|---|---|---|
| JP | 08-161636 | 6/1996 |
| JP | 10-222761 | 8/1998 |
| JP | 11-003390 | 1/1999 |
| JP | 2000-020271 | 1/2000 |
| JP | 2001-357345 | 12/2001 |
| JP | 2003-220748 | 8/2003 |
| JP | 2004-145861 | 5/2004 |

* cited by examiner

FIG. 4A

[PRINTING INTERVAL PARAMETERS]

| | PARAMETER | UNIT (NUMERIC VALUE) |
|---|---|---|
| A-1 | LEADING SPACE (N1) | dot |
| A-2 | WATERMARK PITCH (N2) | dot |

FIG. 4B

[WATERMARK PRINTING CONTROL]

| | PARAMETER | OPTIONS |
|---|---|---|
| B-1 | WATERMARK PRINTING AVOIDANCE CONTROL | USE/DO NOT USE |
| B-2 | WATERMARK PRINTING AVOIDANCE CONTROL OBJECT | ONLY LINEAR BARCODE/ONLY 2D CODE/ ONLY GRAPHIC DATA/ ONLY SYMBOLS (LINEAR AND 2D CODES)/ALL |
| B-3 | TOP/BOTTOM MARGINS | INSERT/DO NOT INSERT |

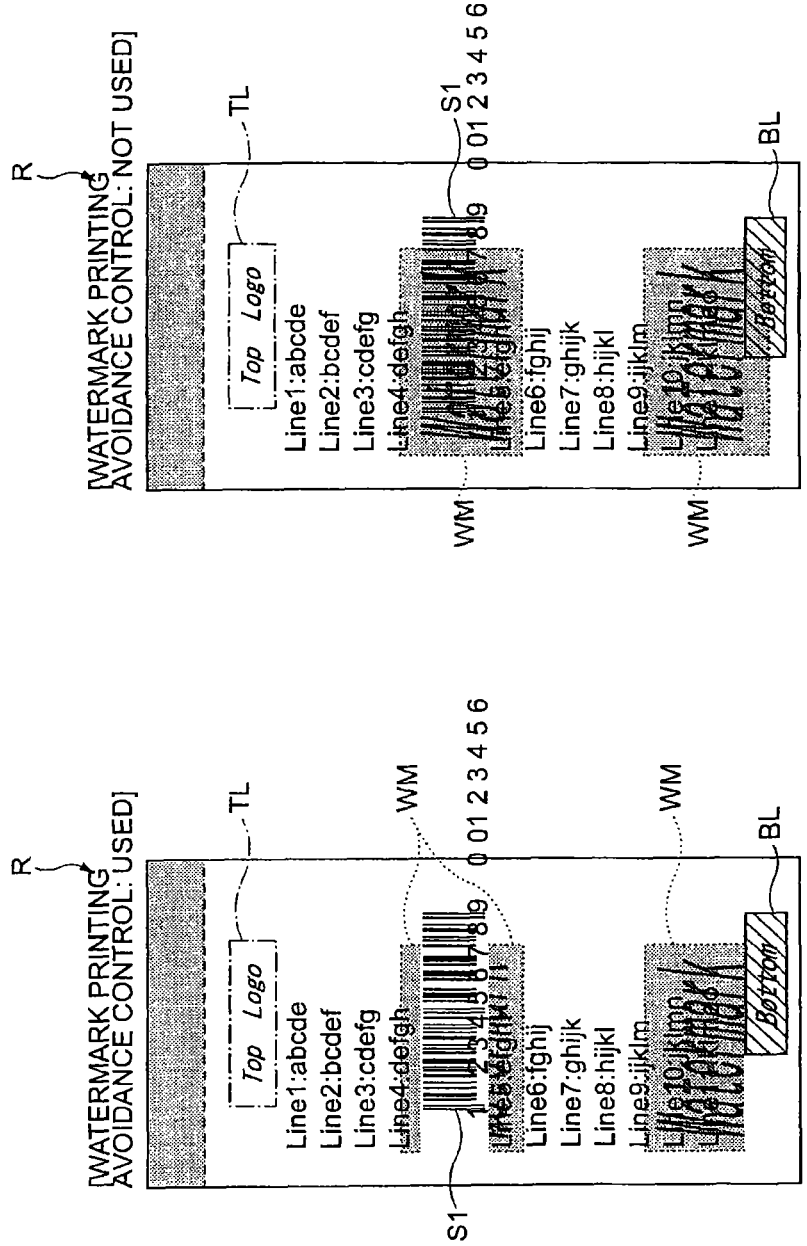

PRINTING APPARATUS AND PRINTING CONTROL METHOD FOR DETERMINING WHETHER AND WHERE TO PRINT A WATERMARK RELATIVE TO PRINT DATA

CROSS REFERENCE TO RELATED APPLICATIONS

This application is a continuation of, and claims priority under 35 U.S.C. §120 on, U.S. application Ser. No. 11/158, 559, filed Jun. 22, 2005, now U.S. Pat. No. 8,867,087, which claims priority under 35 U.S.C. §119 on Japanese patent application no. 2004-186363, filed Jun. 24, 2004. The content of each such related application is incorporated by reference herein in its entirety.

BACKGROUND OF THE INVENTION

1. Field of Technology

The present invention relates to a printing apparatus, a printing system, and a printing control method for printing a background image such as a watermark on a receipt along with print data sent from a host apparatus.

2. Description of Related Art

Technology for printing a background image of a watermark on paper is known from the literature and disclosed in for example, Japanese Unexamined Patent Appl. Pub. 2003-220748.

Watermarks are printed to indicate that a document is confidential by printing a particular image (mark) repeatedly at regular intervals on a receipt. For example, a watermark may be printed as a store logo, at regular intervals on a receipt issued at the point of sale. An example of a receipt with a watermark WM is shown in FIG. 11A.

The background image is typically not printed by the local printing apparatus (receipt printer) on this type of roll paper used for printing receipts. Instead, as is shown in FIG. 11B, the pattern or mark used as the background image is pre-printed at the factory and the paper is then wound into rolls and supplied as preprinted rolls for use in the store. A receipt printer then prints the transaction information and other print data at the point of sale on roll paper having a preprinted background pattern for issuance as a receipt. The purpose of printing the background image on the local printing apparatus instead of using preprinted roll paper is to print transaction data superimposed on watermark data on a receipt, that is, so that the same type of sales receipt having a watermark in the background can be issued by the receipt printer without using preprinted roll paper. When the watermark is printed by the printer, the watermark is printed at a regular interval in the same way as on preprinted roll paper.

As shown in FIG. 11C barcodes (S1) and other data symbols are often printed on receipts today. When a barcode is printed over the watermark WM, the watermark can interfere with the ability to read the barcode. In addition, receipts are increasingly printed with a top logo TL containing the store name, address, and even a store logo at the top of the receipt, and other image data, such as product coupons, may be printed at other desired locations on the same receipt. If these images are printed over the watermark and thus overlap, the non-watermark image may be illegible and detract from the appearance of the receipt.

The present invention provides a printing apparatus, a printing system, and a printing control method which prevents the loss of readability and visual appeal, caused by superimposing the printing of specific print data on a watermark.

SUMMARY

A printing control method for a printing apparatus with watermark printing capability is capable of avoiding printing a watermark on a receipt where print data sent from a host apparatus identified as specific print data is to be printed.

Such a method comprises selecting whether to avoid printing the watermark over specific print data based on a specific command; identifying the specific print data based on the specific command; identifying a specific printing area where the specific print data is to be printed when avoidance of printing the watermark over the specific print data is selected; and printing the watermark on the receipt avoiding the specific printing area. A watermark is thus not printed in the same area as the specific print data. A loss of readability or legibility of the specific print data can thus be avoided.

Furthermore, because the watermark is stored on the printer, not on the host apparatus, and added when printing, control enabling adding a watermark and avoiding printing the specific print data superimposed with the watermark can be added with minimal investment and without modifying the application running on the host.

The specific command may be a graphics, two dimensional (2D) code, or linear bar code command.

The specific printing area may be along a leading or trailing end of the specific printing data in the lengthwise direction of the receipt, or along the right or left side of the specific printing data in the widthwise direction of the receipt.

The method may further comprise adding a HRI form area as the specific printing area when the specific command is a linear bar code command.

The method may further comprise adding a quiet zone as the specific printing area when the specific command is a 2D code command.

The method may also comprise adding a space above, below, to the right, to the left, or surrounding the specific printing area.

In another aspect, a printing apparatus capable of printing a watermark superimposed with print data is provided. Such printing apparatus comprises a receiving unit that receives specific print data and a specific command; a storage unit that stores selecting information as to whether to avoid printing the watermark over the specific print data relating to the specific command; a controller that identifies the specific print data based on the specific command, and identifies a specific printing area where the specific print data is to be printed when avoidance of printing the watermark over the specific print data is selected; and a printing unit that prints the watermark on the receipt avoiding the specific printing area.

This aspect of the invention enables the user to decide whether to use watermark printing avoidance control to avoid printing the watermark superimposed with specific print data. Whether the watermark is needed can also be selected according to the pattern, density, or colors of the watermark that is used.

The printing apparatus may be configured to perform any of additional steps of the method.

A further aspect of the invention is a program for causing parts of a printing apparatus as described herein to operate. This program thus affords a printing apparatus whereby problems such as a loss of readability or legibility in the specific print data resulting from printing a watermark superimposed with the specific print data can be avoided.

Other attainments together with a fuller understanding of the invention will become apparent and appreciated by referring to the following description and claims taken in conjunction with the accompanying drawings.

BRIEF DESCRIPTION OF THE DRAWINGS

FIGS. 4A and 4B describe parameter settings of the printing apparatus;

FIGS. 6A and 6B show print samples when watermark printing avoidance control is used and is not used;

DESCRIPTION OF THE PREFERRED EMBODIMENTS

A printing apparatus, a program, a printing system, and a printing control method according to the present invention are described below with reference to the accompanying figures.

When specific print data is contained in the print data, this invention identifies the printing area where this specific print data is to be printed (this area is referred to as the "specific printing area" below), and then avoids this specific printing area when printing the watermark. The present invention can thus provide a printing apparatus, a program, a printing system, and a printing control method that can prevent a drop in the readability and legibility of specific print data.

The present invention is described below using by way of example a printing system applied to a POS system such as used in supermarkets, convenience stores, and other retail businesses.

Figure 1:
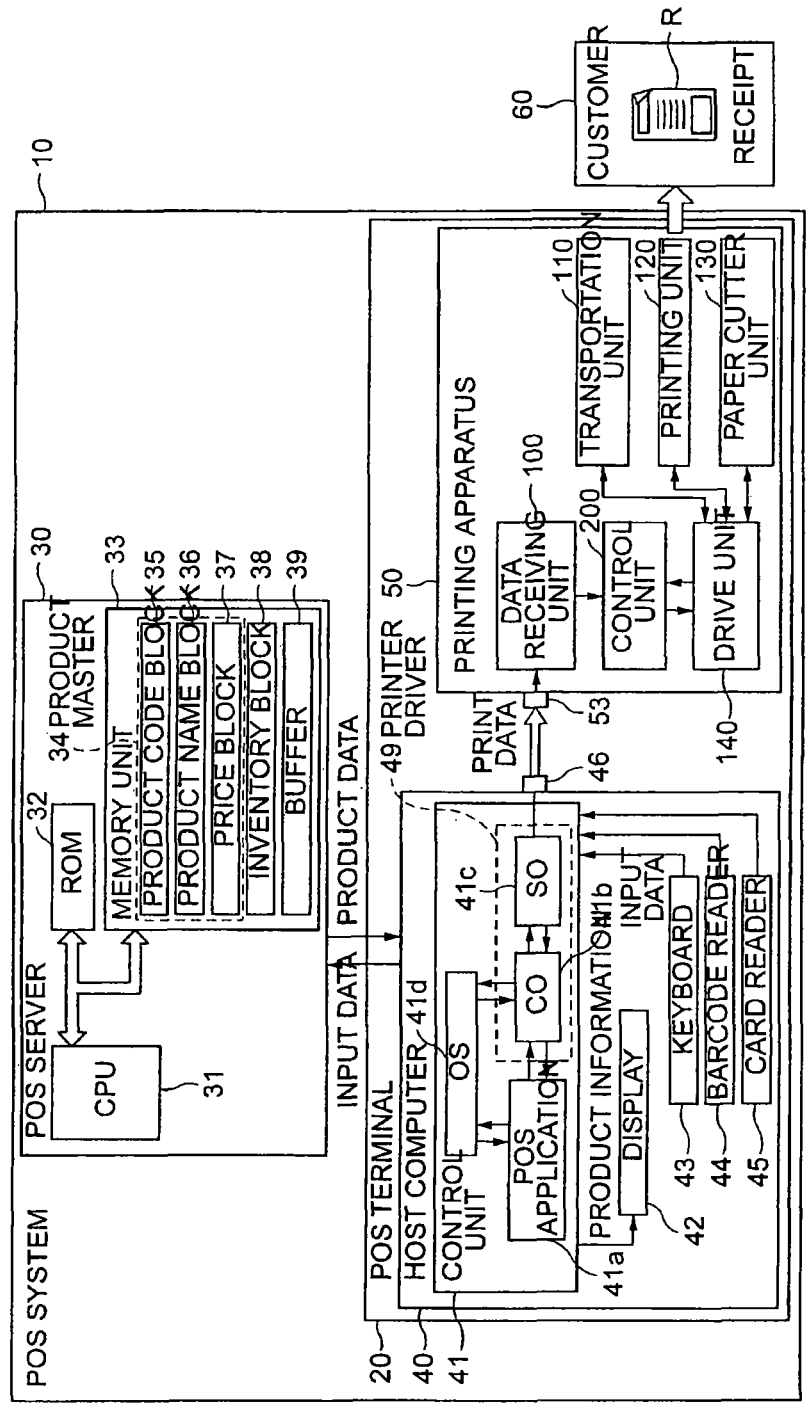
FIG. 1 is a schematic diagram showing a POS system according to a preferred embodiment of the present invention.

As shown in FIG. 1, a POS system 10 according to the present invention has a POS terminal 20 composed of a host computer 40 (POS computer) and printing apparatus (receipt printer), and a POS server 30 connected with the POS terminal 20 over a network for centrally managing the POS terminal 20.

The POS server 30 has a CPU 31, and memory including ROM 32 and MEMORY UNIT 33 (consists of RAM and hard disk, etc.). The CPU 31 processes data stored in MEMORY UNIT 33 according to a control program stored in ROM 32. A product code block 35, product name block 36, price block 37, and inventory block 38 are stored in MEMORY UNIT 33. Based on the input information from the POS terminal 20, the CPU 31 retrieves and outputs product information such as product data (e.g. the product code, product name, and price, etc.) to the POS terminal 20. Based on the received product information, the POS terminal 20 then generates transaction information print data for printing on a receipt R of the printing apparatus 50 and display information for display on the display 42 of the POS terminal 20.

"Product data" as used herein denotes the data from which the transaction information print data (see FIG. 3) used to print the content of the transaction process on a receipt R is generated.

The product code block 35, product name block 36, and price block 37 are collectively referred to as a product master 34, a database of records containing related information for individual products.

The POS terminal 20 has a host computer 40 and printing apparatus 50 (receipt printer) interconnected through connectors 46 and 53. The host computer 40 acquires product data from the product master 34 stored on the POS server 30 and generates transaction information print data. The printing apparatus 50 prints a receipt R based on the transaction information print data.

The host computer 40 gets information about the products (product data) based on input data acquired from the products by reading barcodes with a barcode reader 44 or the operator manually entering data using the keyboard 43. Credit card information for credit card transactions and customer information such as a membership number can also be acquired by scanning a customer credit card or member card using a card reader 45. If authorization is required such as to use a credit card, the credit card information is sent to the credit card authorization server (not shown in the figure) used by the credit card company to determine if the transaction can be processed. If the credit card is authorized, the host computer 40 runs a credit card transaction process. If the authorization is refused, the customer tries again with other credit cards or selects payment by cash.

The host computer 40 also has a display 42 for presenting the product information generated from the product data received from the POS server 30 so that the customer 60 and the operator can also view the product and price information.

The host computer 40 is controlled by an OLE for Retail POS (OPOS below) printer driver that operates under Windows (R) or other operating system 41d. OPOS provides the POS application 41a running under the OS 41d with a device-independent interface to the printer 50, barcode reader 44, and other peripheral devices, and is composed of a control object (CO) 41b for each device category and a service object (SO) 41c for each device model.

The POS application 41a generates transaction information print data for printing on a receipt R based on the product data and input information sent from the POS server 30. This print data is sent by way of the OS 41d to the printer CO 41b and then from the printer CO 41b to the SO 41c corresponding to the model of printer 50. The SO 41c processes the print data to generate print commands using the command system of the printer 50 and then send the print commands and print data to the printer 50. Note that the foregoing OPOS is supplied to the user as a printer driver 49 combining the CO 41b and SO 41c.

Figure 7A:
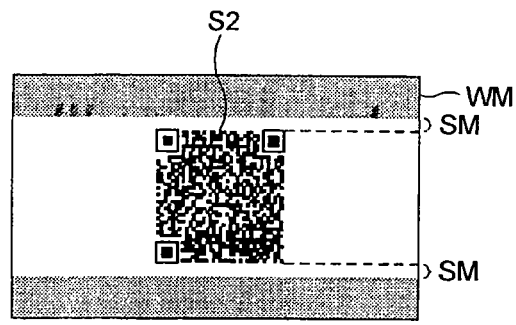
FIGS. 7A and 7B show print samples when watermark printing avoidance control is used.

The POS application 41a generates data symbols such as a linear barcode S1 as shown in FIG. 6A or a 2D code S2 as shown in FIG. 7A for printing on a receipt R based on the content of the transaction process, and reads and adds primarily graphic data to the transaction information print data. This graphic data is typically a previously stored top logo TL or bottom logo BL (both shown in FIG. 3). The logos could be a combination of text data and graphic data, or only a text data. The combination of such symbols or graphic data with the transaction information print data is collectively referred to as the print data below.

The symbols and graphic data could alternatively be generated by the POS server 30 (or stored on the POS server 30) and then acquired from the POS server 30 by the host computer 40 and added to the transaction information print data.

Further alternatively, the graphic data could be stored in the printer driver 49 and added by the printer driver 49 to the transaction information print data.

The printing apparatus 50 (also referred to herein as simply a printer) is a receipt printer that uses a thermal head, and has a data receiving unit 100 for receiving control commands and print data from the host computer 40, a transportation unit 110, printing unit 120, paper cutter unit 130, a drive unit 140 for driving the printing unit 120 and paper cutter unit 130, and a control unit 200 controlling overall operation of the printer 50.

Figure 2:
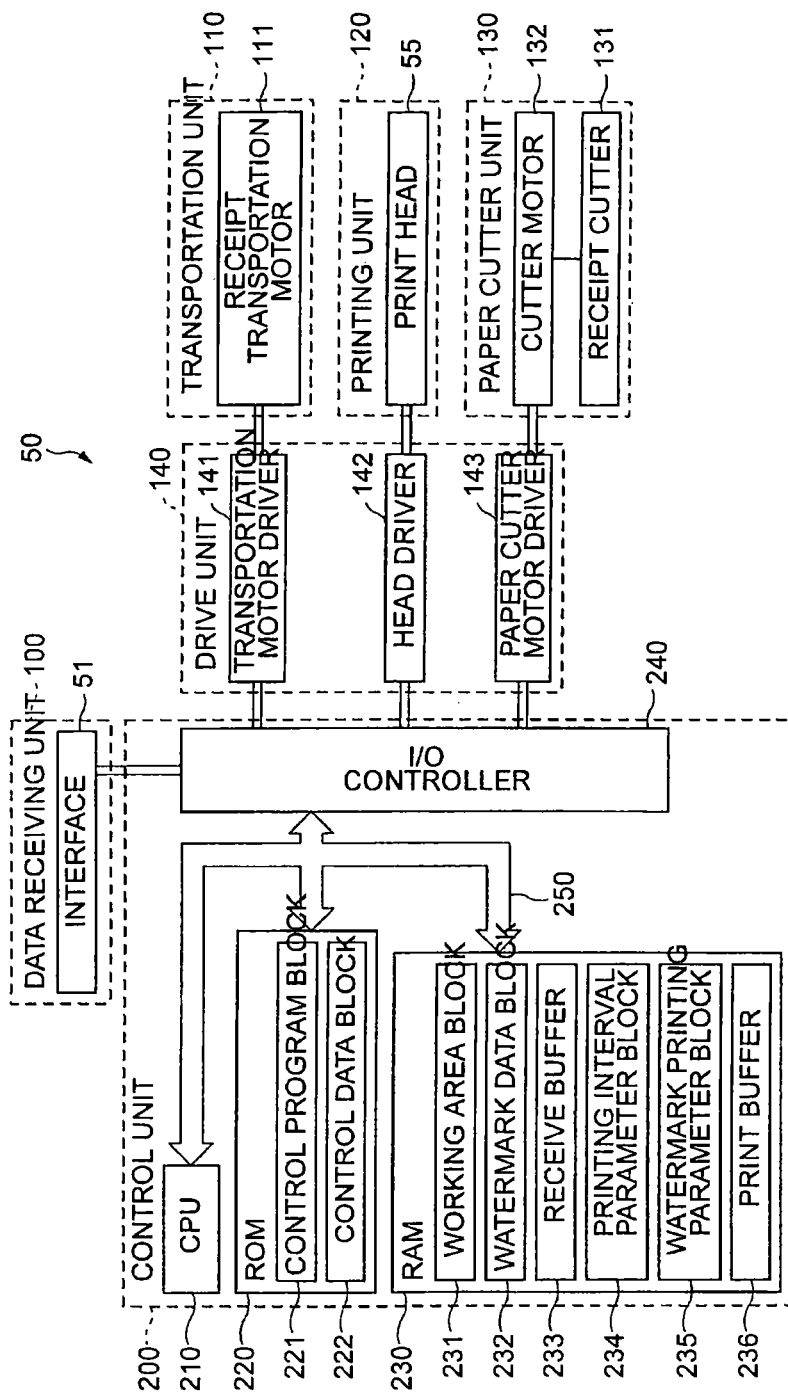
FIG. 2 is a control block diagram for the printing apparatus.

The control unit 200 has memory (RAM 230 as shown in FIG. 2) for storing data for printing watermarks WM and various user settings, and controls watermark WM printing (such as the location of the watermark) according to these user settings. The control unit 200 also provides the control for avoiding printing the watermark WM over (behind) the specific print data when specific print data (such as the symbols or graphic data) is received from the host computer 40.

The control arrangement of this printer 50 is described in detail next with reference to FIG. 2.

As shown in the figure, the printer 50 has a data receiving unit 100, a transportation unit 110, a printing unit 120, a paper cutter unit 130, a drive unit 140, and a control unit 200.

The data receiving unit 100 has an interface 51 for exchanging data with the host computer 40.

The transportation unit 110 has a receipt transportation motor 111 and conveys the receipt R for printing or when a paper feed switch (not shown in the figure) is pressed.

The printing unit 120 has a print head 55 (thermal head) for printing data to the receipt R conveyed by transportation of the receipt R.

The paper cutter unit 130 has a receipt cutter 131 and cutter motor 132 for driving the receipt cutter 131 to cut the trailing end of the receipt R.

The drive unit 140 has a transportation motor driver 141, head driver 142, and paper cutter motor driver 143 for driving the transportation motor, print head, and paper cutter.

The control unit 200 is connected to these other parts to control overall operation of the printer 50.

The control unit 200 has a CPU 210, ROM 220, RAM 230, and input/output control unit (I/O CONTROLLER: input output controller) 240 interconnected over an internal bus 250.

ROM 220 has a control program block 221 for storing a control program run by the CPU 210 to control printer operation, and a control data block 222 for storing identification data for determining if the print data received from the host computer 40 is the specific print data that is to be printed without having a watermark WM printed at the same location, and other control data such as character font data for printing text. The character font data could be stored in a dedicated font ROM instead of in ROM 220.

The RAM 230 has a working area block 231 for storing flags, a watermark data block 232 for storing data for watermark WM printing (referred to below as the watermark data), a receive buffer 233 for temporarily storing the print data received from the data receiving unit 100, a printing interval parameter block 234 for storing parameters related to watermark WM printing (see FIG. 4A), an watermark printing parameter block 235 for storing parameters (see FIG. 4B) relating to printing the watermark WM at the same position as the received print data, and a print buffer 236 for converting the received print data into print data that can be printed by the printing unit 120.

The RAM 230 is also constantly backed up so that the stored data is not lost if the power fails. Flash ROM or other nonvolatile memory could alternatively be used instead of RAM 230 to store nonvolatile data.

The watermark data stored by the watermark data block 232 includes the image (graphic) data used to print the watermark WM and information relating to the printing size and the printing position of the watermark WM on the receipt. The watermark data can also be read in line units in conjunction with the print data.

The receive buffer 233 stores the print data in line units according to the printing sequence. The capacity of the receive buffer 233 is sufficient to store multiple lines of data.

An external data entry device (not shown in the figure) for entering parameter values is connected to the printing apparatus 50, and the printing interval parameter block 234 and watermark printing parameter block 235 store the parameter values set by the user (operator) operating the external device. These parameters are described more fully below with reference to FIG. 4A and FIG. 4B. The watermark data settings noted above can also be entered using this external data entry device. The host computer 40 can also be used as the data entry device.

The print buffer 236 stores the print data and watermark data stored in the receive buffer 233 and watermark data block 232 as bit image data that can be printed by the printing apparatus 50.

The I/O controller 240 also includes logic circuits composed of gate arrays and custom IC devices for complementing the functions of the CPU 210 and handling interface signals for communication with peripheral circuits. The I/O controller 240 thus passes print data and control data received from the host computer 40 to the internal bus 250 either directly or after processing the data, and works in conjunction with the CPU 210 to output data and control signals output from the CPU 210 through the internal bus 250 to the printing unit 120 and other parts either directly or after processing the data.

Thus comprised, the CPU 210 receives signals and data from the other parts of the printer 50 via the I/O controller 240 by according to the control program stored in ROM 220 and the parameters stored in RAM 230. The CPU 210 also processes data in RAM 230 based on the received signals and data, and controls printing the print data received from the host computer 40 and printing the watermark WM by outputting signals and data through the I/O controller 240 to the printer 50.

Figure 3:
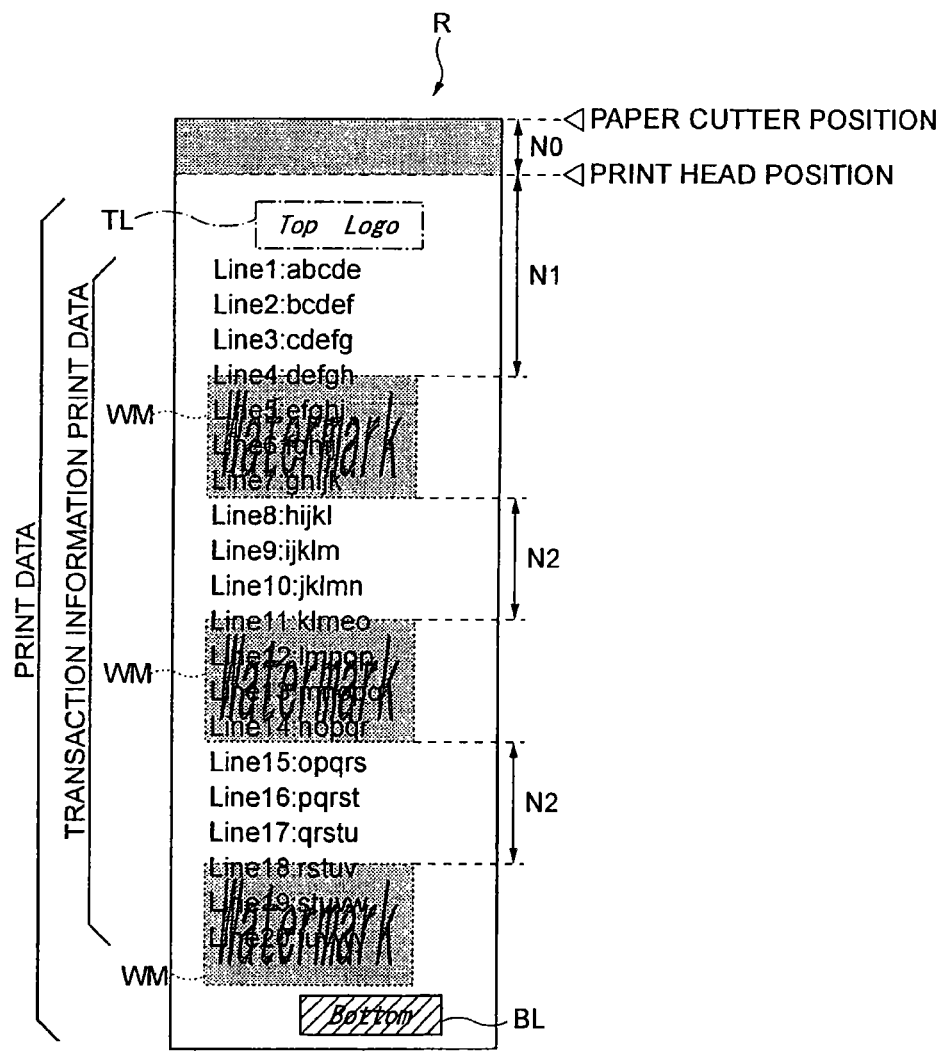
FIG. 3 shows an example of a printed receipt.

Printing a receipt R having the receipt print data and watermark WM printed at the same location on a receipt R as shown in FIG. 3 is described by way of example next.

The printing apparatus 50 receives print data (top logo TL, transaction information print data, bottom logo BL) from the host computer 40 through the interface 51, detects each line of print data, and stores the print data in the receive buffer 233. The print data is then converted line by line to bit image data and stored in the print buffer 236.

The printing position (printing line) of the watermark WM is then determined according to the data in the watermark data block 232 and the parameters stored in the printing interval parameter block 234, including the leading space N1 and the watermark pitch N2 (parameters A-1 and A-2, respectively, in FIG. 4A). These parameters enable determining the correlation between the printing position of each line of the watermark WM and each line of print data. The print data and watermark data can be printed on the same line by converting the watermark data in the watermark data block 232 to bit image data and then combining the watermark bit image data line by line with the bit image data of the print data previously converted and stored in the print buffer 236, and then sending this data from the print buffer 236 to the printing apparatus 50 for printing.

Depending upon the parameters (whether watermark printing avoidance control is applied and to what data watermark printing avoidance control is applied) stored in the watermark printing parameter block 235 (see parameters B-1 and B-2 in FIG. 4B), printing the watermark WM in the specific printing area where specific print data (such as the top logo TL, bottom logo BL, or other graphic data) is printed can also be avoided. Printing the watermark WM in a specific printing area can be avoided by not adding the watermark data to the lines in the print buffer 236 where print data converted from the specific print data is stored.

Furthermore, if top/bottom white space margins SM (see parameter B-3 in FIG. 4B and FIG. 9A) are also set in the watermark printing parameter block 235, printing the watermark WM in these top and bottom margins can also be avoided by not writing the watermark data to the lines in the print buffer 236 corresponding to these margins.

The parameters set in the printing apparatus 50 are described further below with reference to FIG. 4A and FIG. 4B.

As noted above, there are two types of user-definable parameters, parameters relating to the printing interval and parameters relating to watermark printing control. The specific parameters are set using specific parameter commands. The parameters relating to the printing interval are described first with reference to FIG. 4A.

As noted above, there are two printing interval parameters, the leading space N1 (parameter A-1 in FIG. 4A) and the watermark pitch N2 (parameter A-2 in FIG. 4A), which is the distance from one watermark to the next watermark. These parameters are set in dot units based on numeric input from the user. The position of the watermark WM is determined by the input values.

As shown in FIG. 3, the leading space N1 controls the printing interval from the print head position to the leading edge of the printing position of the first watermark WM.

The leading space N1 does not indicate the printing start position (N0+N1) (where N0 is determined by the distance from the print head position to the paper cutter position in the printing apparatus 50 (referred to below as the head-to-cutter distance)) measured from the leading edge of the receipt. Printing the first watermark WM thus starts after feeding the paper the distance of leading space N1 from where the leading edge of the receipt paper (indicated by a solid line in FIG. 3) is at the paper cutter position (at which time the print head is located distance N0 from the paper cutter). Note that the parameters could be set so that the leading space N1 is the printing distance from the leading edge of the paper (N0+N1).

The watermark pitch N2 defines the printing interval between adjacent watermarks WM. This printing interval between adjacent watermarks WM specifies the distance in the paper feed direction from the trailing end of any one watermark WM to the leading end of the next watermark WM. Note that this parameter could alternatively be defined so that the watermark pitch N2 is the length between a defined reference position in each watermark WM.

The leading edge of the receipt depends upon the position of the print head, specifically the (1) position of the print head immediately after the power turns on, (2) the position of the print head immediately after the receipt paper is cut, or (3) the position of the print head immediately after executing a print buffer clear command to clear the print buffer 236 when an error occurs, for example.

Furthermore, the trailing end of the receipt depends upon the position of the receipt cutter 131 after the receipt paper is cut.

The watermark WM is thus positioned (printed) in the printing range between the leading edge and the trailing edge of the receipt. Furthermore, the leading space N1 and watermark pitch N2 determining the position of the watermark WM are values set within the printing range of the watermark WM.

The area corresponding to the head-cutter distance N0 is thus handled as outside the watermark WM printing region. The paper range resulting from feeding the paper to the receipt cutting position, the paper range resulting from paper feed to index the print head, and the paper range resulting from paper feed when the paper feed button is pressed are also considered outside the watermark printing region.

Parameters relating to watermark printing are described next with reference to FIG. 4B. As shown in FIG. 4B there are three parameters relating to watermark printing: watermark printing avoidance control (B-1), the watermark printing avoidance control target (setting the specific print data to which watermark printing avoidance control is applied, B-2), and the top/bottom white space margins SM augmenting the area in which watermark printing is to be avoided (B-3). These parameters are normally set by selecting from a number of choices. The settings are identified by flags, for example, and stored in the watermark printing parameter block 235.

The watermark printing avoidance control parameter B-1 controls whether watermark printing avoidance control is applied, that is, whether or not to avoid printing a watermark WM over the specific print data. The default setting is to apply watermark printing avoidance control as shown in FIG. 6A. To "avoid printing a watermark WM" as used herein does not mean to shift printing the watermark WM to the next line, but instead means that the watermark is not printed at the same position as the specific print data.

The watermark printing avoidance control target parameter B-2 sets the specific print data, and can be set to one of the following options: linear barcodes only, 2D codes only, graphics only, symbols (linear and 2D codes) only, or all of these. The default is "all."

Furthermore, "graphics" includes all image data, including top and bottom logos composed of image data.

The specific print data is detected (identified) by evaluating the print commands and print data sent from the host computer 40 based on the identification data stored in the control data block 222 (see FIG. 2). For example, in an ESC/POS™ command system, a barcode S1 can be identified from the [GS k] command, a 2D code S2 can be identified from the [GS (k] command, and bit images (graphics) can be identified from the [GS (L] command. These print commands also define the length of the print data following the print command. The location of the last print data can thus be known, and the printing area of the converted print data can also be known.

The top/bottom margin parameter SM B-3 controls whether a margin of white space SM of a specific width is left on the top and bottom sides of the printing area (see FIG. 9A) where the specific print data is printed when printing a watermark WM over the specific print data is avoided. The default setting is no white margin (as shown in FIG. 6A). If the top/bottom margin parameter SM B-3 is set, the width of the margin SM could also be set by the user.

Figure 5:
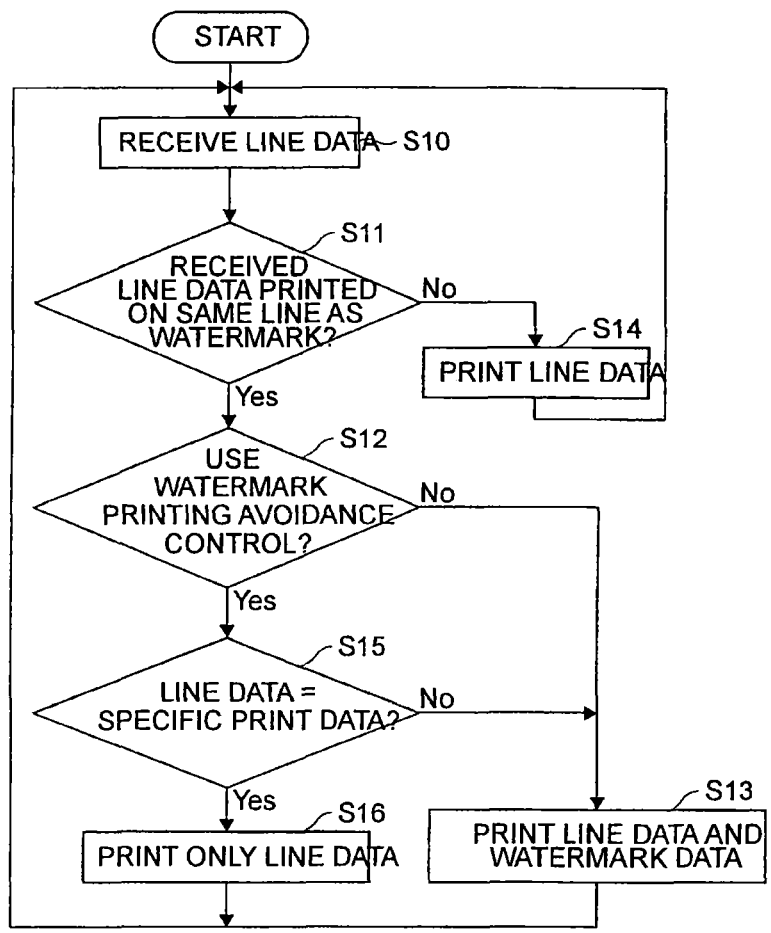
FIG. 5 is a flow chart describing the watermark printing avoidance control process of the present invention.

Watermark printing control according to the present invention is described next with reference to the flow chart in FIG. 5.

After line data (print data) is received from the host computer 40 and stored in line units to the receive buffer 233 (S10), the lines on which the watermark WM is printed can be determined and whether the line print data is print data to be printed on the same line as the watermark WM (that is, whether line print data for line 4 (Line:4defgh) to line 7 (Line:7gnjk) in FIG. 3) can be determined (S11) based on the watermark data stored in the watermark data block 232 and the leading space N1 and watermark pitch N2 parameters stored in the printing interval parameter block 234.

If line data corresponding to a watermark WM print line was received (S11 returns yes), whether watermark printing avoidance control is to be used is confirmed (S12). Whether to apply watermark printing avoidance control is determined by reading the watermark printing avoidance control parameter B-1 setting in the watermark printing parameter block 235. If watermark printing avoidance control is not used (S12 returns no), the line data is read from the receive buffer 233 and converted to bit image data for printing, combined with the watermark data for that line and stored in the print buffer 236, and the data is then printed from the print buffer 236 to print the watermark and print data on the same line (S13).

If the received line data is not printed with the watermark WM on the same line (S11 returns no), the line data is read from the receive buffer 233, converted to printable bit image data and stored to the print buffer 236, and then printed. As a result, only the line print data is printed (S14). Control then loops back to step S10 to receive the next line data.

If watermark printing avoidance control is used (S12 returns yes), whether the line print data is the specific print data is confirmed (S15) by reading the watermark printing avoidance control target parameter B-2 setting in the watermark printing parameter block 235 to determine the data type of the specific print data. Whether the received print data is the same data type is then determined. If the received print data does not match specific print data (S15 returns no), the line data and watermark data are printed on the same line as described above (S13).

If the received print data is the specific print data (S15 returns yes), printing the watermark data is avoided and only the line data is printed (S16).

The present invention thus evaluates the received print data line by line and determines if the received line data is both the specific print data and overlaps part or all of the watermark WM, that is, whether the received print data meets the criteria for watermark printing avoidance control. To avoid printing the watermark WM on the same lines as the logo data meeting these criteria, printing the watermark WM is appropriately turned on or off line by line.

More specifically, the present invention does not need to first store plural lines of print data (specifically the same number of lines required to print the watermark WM) received from the host computer 40 in the receive buffer 233, convert the print data in the print buffer 236 to bit image data for printing to determine the specific printing area, and compare the positions of this bit image data with the data for printing the watermark WM to determine if the print data and watermark data overlap.

As a result, the present invention only needs a receive buffer 233 with sufficient capacity to store a line of data. A drop in throughput can also be avoided because converting and comparing all received print data with the watermark data is not necessary.

Determining whether the watermark printing avoidance control criteria are met (whether line data corresponding to a watermark WM print line has been received) can also be described as determining if a portion of the dots in the watermark data are contained in the group of plural dots constituting the line of print data. In this situation line 4 (Line:4defgh) shown in the example in FIG. 3 also meets the watermark printing avoidance control criteria. More specifically, the watermark WM can also be set at the dot level as described above and the position of the watermark WM is therefore not necessarily defined in line units. This method therefore enables determining if a portion of the watermark data is present on the same line as the specific print data. Determining if the watermark printing avoidance control criteria are met is therefore used to mean that a portion of the dots of the watermark data are contained on the same line (in the group of plural dots constituting the line data).

Examples of printing a watermark behind different types of print data based on the above-described user-definable parameters are described next with reference to FIG. 6A to FIG. 9B.

FIG. 6A shows an example of using watermark printing avoidance control when the specific print data to which watermark printing avoidance control is applied is a barcode S1 and bottom logo BL. FIG. 6B shows an example of not using watermark printing avoidance control when printing the same data, or when using watermark printing avoidance control but the barcode S1 and bottom logo BL are not included in the specific print data.

As shown in FIG. 6A the printing area containing the HRI (human readable interpretation, the text embedded along the bottom of the barcode) form of the barcode is also contained in the specific printing area where the barcode S1 is printed. More specifically, this specific printing area is the area contained within a line widthwise to the receipt along the top edge of the barcode S1, a line extending widthwise to the receipt along the bottom edge of the HRI form, and the side edges of the receipt R on the right and left sides of the barcode S1. The example shown in FIG. 6A has the HRI form along the bottom edge of the barcode S1, but the HRI form could alternatively be disposed along the top of the barcode S1 or along both the top and bottom of the barcode S1. In each of these cases, the printing area containing the HRI form is also included in the specific printing area.

Referring to FIG. 5 again, if the watermark printing control decision is made by line unit and a barcode S1 as shown in FIG. 6A is printed, the HRI form is also treated as one line. In this case the line before the barcode S1 (line 4: defgh) and the line after (line 5: efghi) are determined to be lines that do not meet the watermark printing avoidance control criteria (that is, lines that are not contained in the specific printing area), and the watermark is therefore printed on lines 4 and 5. The lines on which the barcode S1 is printed are determined to be within the specific printing area and the watermark is therefore not printed on those lines.

In addition to a linear barcode S1, a 2D code S2 and graphic G are also handled as one line. The line on which the bottom logo BL, which is graphic data, shown in FIG. 6A is printed is therefore determined to be within the specific printing area, and the watermark WM is not printed over the bottom logo BL.

Legibility is thus improved by avoiding printing the watermark WM, and when the specific print data is a data symbol such as a linear or 2D code, barcode readability is not impaired.

Watermark printing avoidance control is not used when printing the receipt shown in FIG. 6B, however, and the watermark WM is thus printed in the same area as the barcode S1 and bottom logo BL. The obvious problem in this case is that legibility and appearance are degraded.

Depending upon the type of printing unit 120 (see FIG. 2) and the pattern of the watermark WM, there are also situations in which printing a watermark over other print data will not cause a problem with legibility. Watermark printing avoidance control is not needed in such situations. In addition, because the watermark WM is not cut off by the specific printing area as shown in FIG. 6A, the appearance of the watermark WM may also be acceptable.

Figure 7B:
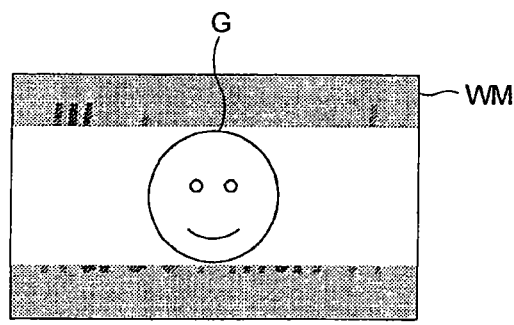
Figure 8A:
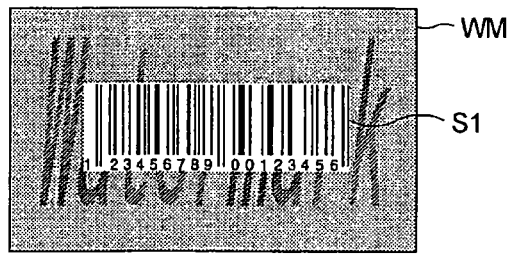
FIGS. 8A, 8B and 8C show print samples when watermark printing avoidance control is used.
Figure 8B:
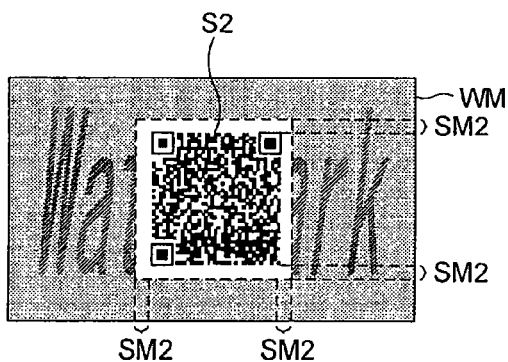
Figure 8C:
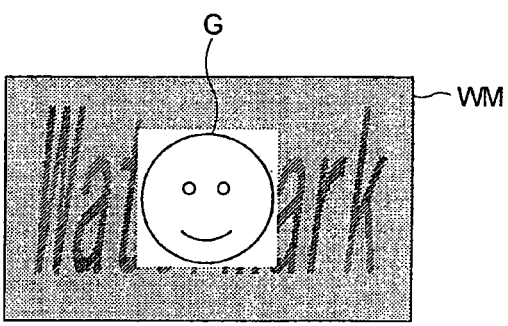

Examples of avoiding printing a watermark WM superimposed with print data other than a linear barcode S1, specifically over a 2D code S2 or graphic G, are shown in FIG. 7A and FIG. 7B. FIG. 7A shows a 2D code S2 printed substantially in the middle of the watermark WM. When a 2D code S2 is used as the specific print data as shown in FIG. 7A, the white space (quiet zone) required by the 2D code S2 specification and added above and below the 2D code S2 (in margins SM2, also shown in FIG. 8B) is also considered part of the specific printing area, and the watermark WM is printed while avoiding the specific printing area including this quiet zone SM2. When printing a 2D code S2, therefore, this quiet zone SM2 is also handled as part of the same line.

Furthermore, regardless of whether top/bottom white space margins SM are defined (parameter B-3, FIG. 4B), this quiet zone SM2 is always added when the received print data is determined from the print command to be a 2D code S2. Problems reading the 2D code S2 can thus be reliably prevented.

When the top/bottom white space margins SM are set, the quiet zone SM2 can be added to the top/bottom white space margins SM or these margin settings SM can be ignored when processing a 2D code S2, that is, only the quiet zone SM2 is added regardless of whether the top/bottom margins SM are set (and the margins SM are not added even if set).

The 2D code S2 could be, for example, a QR code, PDF417, Maxi code, or Vericode, and a specific quiet zone SM2 is added to every 2D code S2.

FIG. 7B shows a graphic G superimposed at approximately the center of the watermark WM. Graphics G are handled in the same way as linear barcodes S1, that is, the area between the leading and trailing ends of the graphic G is treated as one line (specific printing area), and whether a watermark is printed is determined by line unit. White space (quiet zone SM2) such as defined for a 2D code S2 is not added to a graphic G.

Whether to print a watermark WM superimposed with other print data is determined line by line in the foregoing embodiment (see from FIG. 6A to FIG. 7B), but whether to print the watermark WM could also be determined on an area (dot unit) basis. This is described more fully referring to FIG. 8A, FIG. 8B, and FIG. 8C, which show printing a watermark WM in the specific printing area while avoiding printing the watermark WM directly behind the barcode S1, 2D code S2, and graphic G, respectively. The specific printing area in this embodiment is thus delineated by lines widthwise to the receipt along the leading and trailing edges of the specific print data, and lines along the right and left sides of the specific print data in the transportation direction of the receipt.

In this embodiment of the invention whether to print or not print the watermark WM in the horizontal direction (that is, widthwise to the receipt) is determined dot by dot. If printing a 2D code S2 (FIG. 8B), this method avoids printing the watermark in the specific printing area including the margin resulting from adding the quiet zone SM2 both above and below and on both sides of the 2D code S2.

Whether to print the top/bottom white space margins SM dot by dot in the longitudinal direction (lengthwise to the receipt) is determined as described above.

By thus avoiding also printing the watermark WM based on the printing area and not by line unit, more of the watermark WM is left and still printed, thus improving the legibility of the watermark WM and the appearance of the receipt.

Whether printing or not printing the watermark WM is determined by line unit or printing area can also be controlled by the user by storing a corresponding parameter that is then evaluated by the control unit 200 of the printing apparatus 50.

Figure 9B:
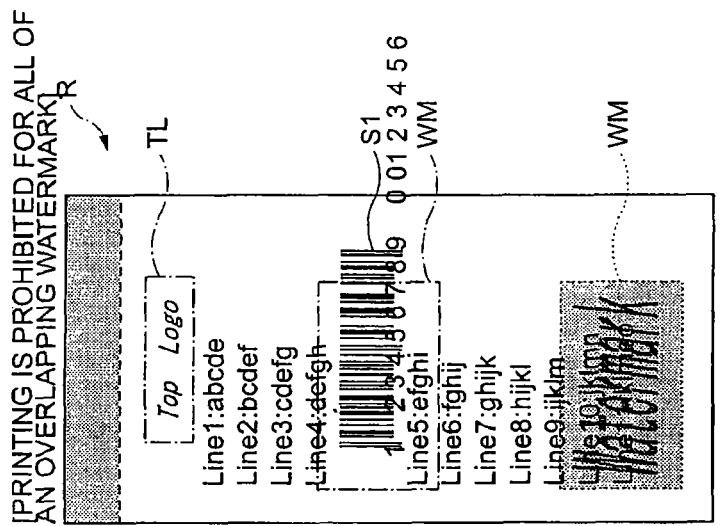
FIGS. 9A and 9B show print samples when watermark printing avoidance control is used.
Figure 9A:
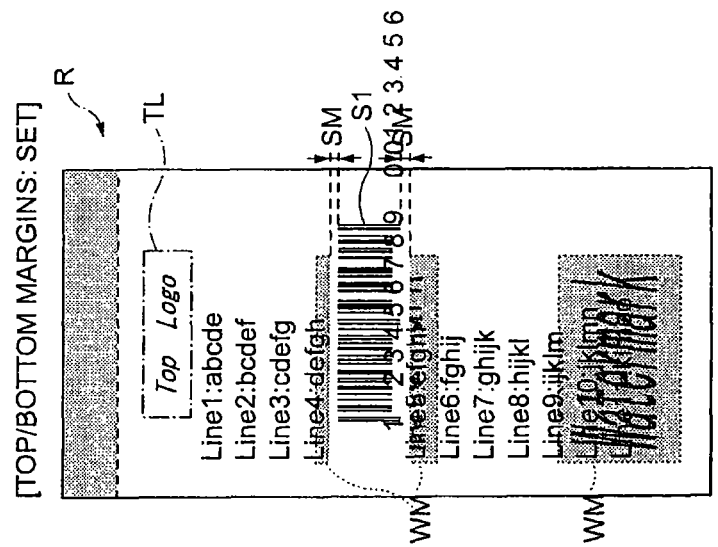

FIG. 9A shows a sample printout when the top/bottom white space margins SM (parameter B-3, FIG. 4B) are set. When these margins are set, the watermark WM is printed while avoiding the area equal to the specific printing area plus the top/bottom white space margins SM (the "specific printing area with margins"). Thus printing the watermark WM with a certain amount of white space above and below or around the specific printing area improves the legibility of the specific print data compared with the printout when there is no surrounding white space as shown in FIG. 6A.

The width of the margin SM is not necessarily fixed and could be varied according to the size of the specific print data for a better appearance. As indicated by margins SM2 in FIG. 8B, margins SM of the same size are preferably provided above and below and on both sides of the watermark when printing the watermark WM in a specific area.

In the foregoing examples the watermark WM is printed while avoiding the specific printing area where specific print data is printed or the specific printing area with margins SM around the specific print data. As shown in FIG. 9B, if the watermark WM is determined to overlap the specific printing area, printing could be omitted for all of the overlapping watermark WM (indicated by the dot-dash line in FIG. 9B) rather than simply not printing the overlapping portion of the watermark.

This method, however, requires determining if all or part of each watermark WM overlaps a specific printing area, and thus requires a receive buffer 233 capable of storing plural lines of print data (that is, the number of lines required to print the entire watermark WM). Another problem with this method is that throughput drops because printing is not possible while converting and storing the print data. On the other hand, this method can improve the appearance of the receipt R by thus completely eliminating the watermark WM because the watermark WM will not be partially blocked or omitted.

Whether to avoid printing the watermark WM in its entirety or only in the overlapping portion thereof could also be controlled by the user by storing and evaluating a corresponding parameter by means of the control unit 200 of the printing apparatus 50.

A second embodiment of the present invention is described next with reference to FIG. 10. This embodiment differs from the foregoing embodiment as described below.

Figure 10:
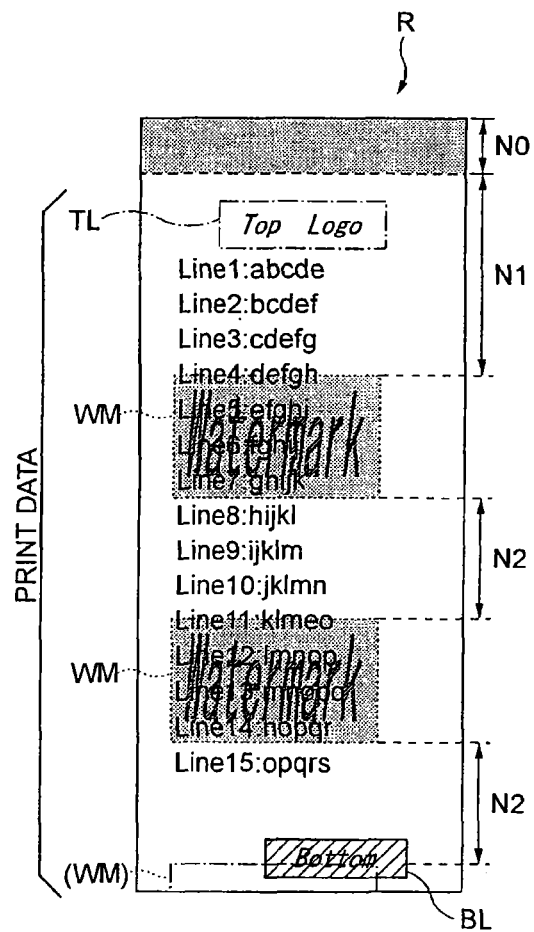
FIG. 10 shows a sample receipt printed by a second embodiment of the invention.
Figure 11C:
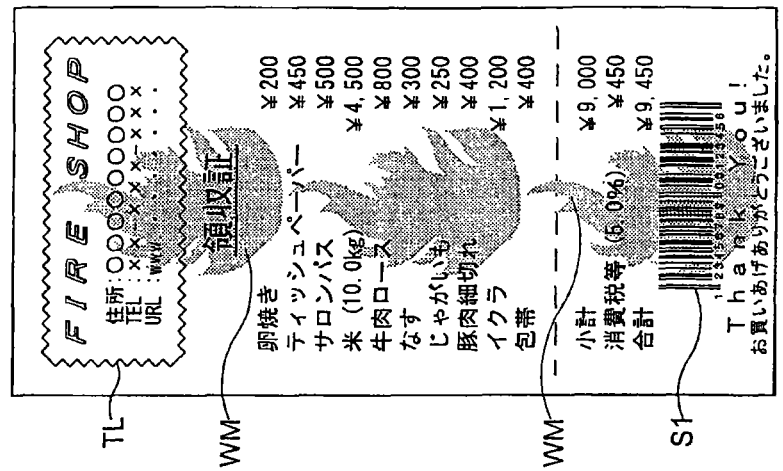
FIGS. 11A, 11B and 11C describe the prior art.
Figure 11B:
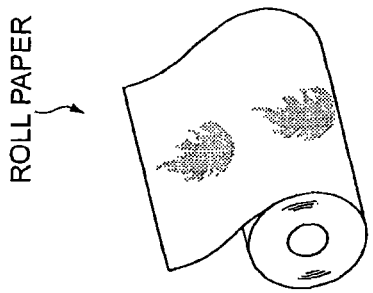
Figure 11A:
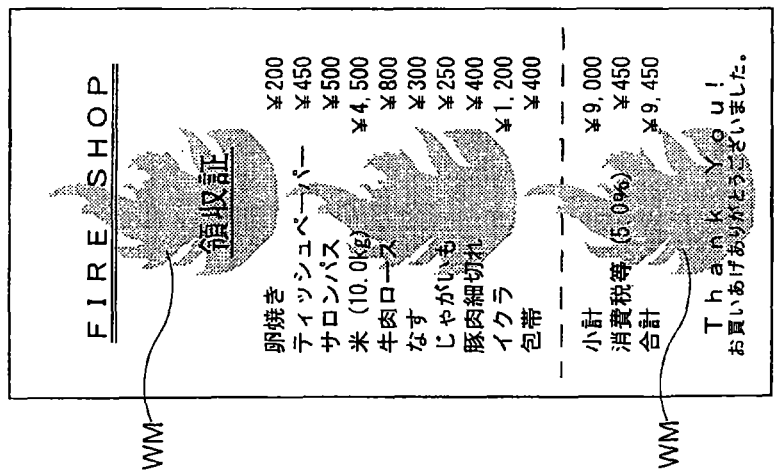

The position of the watermark WM is determined based on the user-definable leading space N1 and watermark pitch N2 parameters in the above embodiment, and the last watermark WM could therefore be cut off (only partially printed) at the trailing end of the receipt depending upon the amount of print data received from the host computer 40 (more specifically the printing length calculated from the print data) as indicated by the dot-dash line in the area of the bottom logo BL in FIG. 10.

The second embodiment of the invention solves this problem by not printing any portion of the last watermark WM at the trailing end if all of the watermark WM cannot be printed. This difference with the first embodiment is described more fully below.

The printing apparatus 50 in this embodiment of the invention identifies and stores each line of print data received from the host computer 40 in the receive buffer 233. After receiving the number of lines required to print the watermark WM, the line print data and watermark data are converted and combined in the print buffer 236. The data is then read from the print buffer 236 and printed. In the sample shown in FIG. 10, therefore, the data is converted line by line through line 3 (Line3:cdefg), which is the last line of print data that can be completely printed within leading space N1. Starting from the line that exceeds leading space N1 (line 4), print data is received until the number of lines equal to the length of the watermark in the transportation direction of the receipt R is buffered (lines 4 through 7), and the received print data is then converted for printing. Lines 8 to 10, which can be printed in watermark pitch N2, are then received and converted line by line, and lines 11 to 14 are converted after all of lines 11 to 14 have been received. When a print command (such as a paper cut command) indicating the end of the receipt is then received, whether the entire watermark WM can be printed is determined. The bottom logo BL and following data are then converted and printed without printing any portion of the watermark WM at the trailing end of the receipt.

This embodiment thus waits to receive the number of lines of print data required to print the watermark WM in the transportation direction of the receipt R before printing, and a corresponding drop in throughput is thus unavoidable. The overall appearance of the receipt R is improved, however, because printing is controlled so that the last watermark WM is not cut off. More specifically, all watermarks WM printed on the receipt R are thus printed in their entirety without cutting off a portion of the last watermark WM even when only one watermark WM is printed on the receipt R.

Alternatively, printing could be delayed until print data for the entire receipt R is received, the printing length (the length of the receipt R) is calculated, and the number of watermarks WM that can be printed in that receipt length is determined. If the last watermark WM will be cut off, that is, all of the last watermark WM cannot be printed, printing any part of the last watermark WM is blocked. This results in a further drop in throughput, but simplifies printing control.

As described above the present invention prints watermarks WM based on the leading space N1, which is the printing interval from the leading edge of the receipt R to the printing position of the first watermark WM, thereby starts printing the first watermark WM at a uniform position, and thus improves the appearance of the receipt R.

Furthermore, the locations of the watermarks WM can be controlled as desired by the user because the leading space N1 and the watermark pitch N2, which is the distance between adjacent watermarks WM, are user definable.

Yet further, problems such as an unsightly appearance resulting from printing the watermark WM superimposed with the top logo TL can be avoided by setting the leading space N1 to a value greater than the length of the top logo TL in the transportation direction of the receipt R.

The leading space N1 and watermark pitch N2 can also be defined as dot values and can be set to unique values (lengths) independent of the printer model. These printing intervals can thus be set as desired by the user.

If specific print data is contained in the print data received from the host computer 40, the specific printing area where this specific print data is printed is avoided when printing the watermark WM. A loss of readability and legibility in the specific print data can thus be avoided.

Whether to use watermark printing avoidance control to avoid printing the watermark WM behind specific print data can also be selected according to the shape and density, for example, of the watermark WM pattern. Furthermore, because whether to use watermark printing avoidance control can be selected according to the type of specific print data, receipts R more closely matching user preferences can be issued.

Yet further, a small capacity receive buffer 233 can be used while avoiding a drop in throughput because whether to print the watermark WM can be determined each time a line of print data is received, that is, because it is not necessary to save and convert plural lines of print data to data for determining the specific printing area in the receive buffer 233, compare the buffered print data with the data for printing the watermark WM, and determine if the watermark WM overlaps the specific print data.

Overlap between the edges of specific print data and the watermark WM and the resulting loss of readability and legibility can also be prevented by setting a white margin SM (see FIG. 9A) above and below or around the specific print data and avoiding printing the watermark WM in this specific printing area with margins.

The second embodiment of the invention yet further improves the appearance of the receipt R by controlling printing so that the last watermark WM is not cut off (printed only partially) at the trailing end of the receipt R.

The watermark data block 232 in the foregoing embodiments stores image data for the watermark WM as well as data relating to the print size of the watermark WM and the printing position of the watermark WM widthwise to the receipt. The watermarks WM are then printed based on this data. Alternatively, however, a detection unit could be disposed to detect the printing width of the receipt R, and the printing size and printing position of the watermark WM could be changed based on the detected receipt width.

Furthermore, if data (print commands) defining the printing size and printing position of the watermark WM is received from the host computer 40, the printing size and printing position could be changed based on the received data.

This eliminates the need to store data for a plurality of watermarks WM of different printing size and printing position according to the width of the receipt, and enables changing the printing size and printing position of the watermark WM as needed according to the receipt width and the printing area of the print data.

Plural types of watermark data can be stored in the watermark data block 232 instead of just one, and which watermark is printed can then be changed according to a user-definable setting. Alternatively, the printing apparatus 50 (control unit 200) could select one of the plural stored watermarks for printing randomly or according to the day, date, or print data content, for example, instead of according to a user setting.

Yet further, instead of repeatedly printing the same watermark data, some or all of plural watermarks stored in the watermark data block 232 could be selected and printed sequentially or in a predefined order.

Graphic data for printing the top logo TL and bottom logo BL is acquired from the host computer 40 in the foregoing embodiments, but could be stored in the printing apparatus 50 and added (printed) to the receipt R triggered by detecting the leading edge or trailing edge of the receipt. This arrangement enables adding a function for easily adding graphic data to a receipt without modifying the POS application 41a when the host computer 40 (POS application 41a) does not have a function for printing a top logo TL or bottom logo BL.

When the printing apparatus 50 is arranged to add graphic data for printing the top logo TL or bottom logo BL, the printing apparatus 50 preferably also avoids printing the watermark WM at the same position as the top logo TL or bottom logo BL.

Parameter settings (see FIG. 4A and FIG. 4B) and watermark data are defined using an external data entry device not shown in the foregoing embodiments, but the host computer 40 could be used as this data entry device. This enables setting the parameters and watermark data without providing and connecting an external device specifically to set these parameters.

The leading space N1 and watermark pitch N2 are set in dot units in the foregoing embodiments, but could be defined in another unit such as centimeters or inches.

The functions of the control unit 200 of the foregoing printing apparatus 50 can also be rendered as a computer-executable program.

This program can also be provided stored on a data recording medium for use on a computer.

Examples of such data recording media include hard disk drives, flash ROM, memory cards (such as Compact Flash (R), Smart Media, and memory sticks), Compact Disc media, magneto-optical discs, DVD media, and floppy disks.

The present invention has been described using a POS system 10 by way of example. As will be obvious to one with ordinary skill in the related art, however, the present invention can also be applied to any printing system, regardless of the terminal type, composed of a host for adding graphic data or data symbols to text data and generating print data, and a printing apparatus for printing a watermark WM added to print data received from the host.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing control method for a printing apparatus capable of printing a watermark on a receipt superimposed with print data, including the steps of:
   (a) dividing said print data into different print data types, the different print data types being associated with different unique identifiers;
   (b) selecting at least one of said data types over which printing of the watermark is to be avoided, the selected data type being termed a specified data type;
   (c) making a record of the specified data type according to its unique identifier;
   (d) in response to receiving print data for printing, writing an image data rendition of the received print data to a memory space;
   (e) executing a watermark-to-memory-space writing sequence wherein watermark data is written over previously written image data of the print data from step (d), wherein said watermark-to-memory-space drawing sequence includes:
      (i) determining locations in the memory space corresponding to where the watermark is to be written;
      (ii) identifying a specific printing area within the memory space where specified print data is located; and
      (iii) when a part of the watermark is to be written to a location that corresponds to the specific printing area, omitting the writing to the memory space of the part of the watermark that corresponds to the specific printing area, and writing to the memory space the parts of the watermark that do not correspond to the specific print area, to create a combined drawing; and
   (f) printing the combined drawing on the receipt.

2. The printing control method of claim 1, wherein said memory space constitutes a single image layer, and said print data and watermark are written to the single image layer.

3. The method of claim 1, wherein in step (d) the print data is received from a host device coupled to the printing apparatus.

4. The method of claim 1, wherein writing, to the memory space includes converting print data to bit image data and storing the converted bit image data to the memory space.

5. The method of claim 1, wherein the memory space is a print buffer.

6. The method of claim 1, wherein the data types correspond to different print commands.

7. The method of claim 6, wherein said unique identifier is a print command, and the specified data types are identified by their corresponding unique print command.

8. The method of claim 7, wherein said corresponding print command is at least one of a graphics print command, a two-dimensional (2D) code print command, and a barcode print command.

9. The method of claim 8, wherein if the corresponding print command is at least one of the 2D code print command and the linear barcode print command, then the specific printing area is expanded to include a human readable interpretation (HRI) of coded information.

10. The method of claim 1, wherein the specific printing area is expanded to include an expanded area extending beyond a minimum area occupied by the written specified print data.

11. The method of claim 1, wherein said specific printing area includes at least one of a leading area preceding the print data in a transportation direction of the receipt and a lagging area following the print data in the transportation direction of the receipt.

12. The method of claim 1, wherein in said watermark-to-memory-space writing sequence:
   the watermark is dividing into print-line segments, the print-line segments traversing the span of the receipt in a direction perpendicular to a transportation direction of the receipt and defined by a line printing capability of the printing apparatus;
   in step (i), corresponding memory spaces where the watermark is to be written are determined separately by print-line segments of the watermark;
   in step (iii), said part of the watermark that corresponds to the specific printing area is defined by a complete print-line segment of the watermark.

13. The method of claim 12, wherein when a print-line segment of the watermark is to be written to a memory location that corresponds to specific printing area, the entire print-line segment of the watermark is omitted and not written to the memory space.

14. The method of claim 12, wherein when a print-line segment of the watermarks corresponds to specific printing area, only a portion of the print-line segment of the watermark that coincides with the specific printing area is omitted and not written to the memory space.

15. The method of claim 12, wherein said memory space is of a size sufficient for storing only one print-line of data as defined by the line printing capability of the printing apparatus.

16. The method of claim 1, wherein said print data and watermark are both written in the foreground of the receipt.

17. The method of claim 1, wherein said printing apparatus is integrated within a point-of-sale (POS) device, and said print data includes sales transaction information.

18. The method of claim 17, wherein a print data type that defines sales transaction information for printing is not selected as said data types over which printing of the watermark is to be avoided, and the watermark is permitted to overwrite the sales transaction information on the receipt.

19. A non-transitory storage medium that stores a program executed by a controller that controls parts of a printing apparatus, the program causing the controller to perform steps of claim 1.

* * * * *